(12) United States Patent
Nishiyama

(10) Patent No.: US 11,852,476 B2
(45) Date of Patent: Dec. 26, 2023

(54) TIDAL CURRENT INFORMATION DISPLAY APPARATUS AND METHOD

(71) Applicant: Furuno Electric Co., Ltd., Hyogo (JP)

(72) Inventor: Koji Nishiyama, Ibaraki (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 322 days.

(21) Appl. No.: 17/451,124

(22) Filed: Oct. 15, 2021

(65) Prior Publication Data

US 2022/0268580 A1   Aug. 25, 2022

(30) Foreign Application Priority Data

Feb. 19, 2021 (EP) .................................. 21158110
May 21, 2021 (JP) ................................ 2021-086530

(51) Int. Cl.
*G01C 13/00* (2006.01)
*G08B 5/22* (2006.01)

(52) U.S. Cl.
CPC ............. *G01C 13/002* (2013.01); *G08B 5/22* (2013.01)

(58) Field of Classification Search
CPC .... G01C 13/006; G01C 13/004; G01C 13/00; G01C 13/002; G01C 13/008; G01C 5/06;
(Continued)

(56) References Cited

U.S. PATENT DOCUMENTS

2008/0255757 A1   10/2008   Bruce et al.
2020/0090414 A1   3/2020   Nishiyama
(Continued)

FOREIGN PATENT DOCUMENTS

CN   115307633 A   *   11/2022   ............ B63B 49/00
EP   4148387 A1   *   3/2023   ............ B63B 49/00
(Continued)

OTHER PUBLICATIONS

Wisernig, E. et al., "Augmented Reality Visualization for Sailboats (ARVS)", Proceedings of the 2015 International Conference on Cyberworlds (CW), IEEE, Oct. 7, 2015, Visby, Sweden, 8 pages.
(Continued)

*Primary Examiner* — Andre J Allen
(74) *Attorney, Agent, or Firm* — Alleman Hall Creasman & Tuttle LLP

(57) ABSTRACT

A tidal current display data generation apparatus for a movable body, for displaying tidal current information on a display screen, includes a tidal current information receiving terminal configured to receive tidal current information including a position of a tidal current on a chart of a region including the movable body, and a plurality of predicted tidal current directions of the tidal current at the position at a corresponding plurality of time instants, and a tidal current display data generation terminal configured to generate an indicator including a time scale determined according to the plurality of time instants, determine position of each predicted tidal current direction on the time scale at respective time instant, generate a plurality of symbols for respective positions on the time scale, each symbol indicating respective predicted tidal current direction at respective time instant, and output the indicator including the plurality of symbols to the display screen.

18 Claims, 14 Drawing Sheets

(58) Field of Classification Search
CPC .......... G01C 17/34; G01C 25/00; G01C 5/04;
G01C 9/00; G01C 9/06; G01C 9/14;
G01C 9/18; G01C 21/16; G01C 21/185;
G01C 21/203; G01C 9/12; G08B 21/10;
G08B 19/02; G08B 21/02; G08B 21/00;
G08B 21/182; G08B 25/08
USPC .......................................... 73/170.29–170.34
See application file for complete search history.

(56) References Cited

U.S. PATENT DOCUMENTS

| | | | | |
|---|---|---|---|---|
| 2020/0298941 | A1* | 9/2020 | Terada | H04N 23/90 |
| 2021/0185238 | A1 | 6/2021 | Seike et al. | |
| 2022/0268586 | A1* | 8/2022 | Nishiyama | G01C 21/3867 |
| 2022/0357158 | A1* | 11/2022 | Okuda | G06F 3/0481 |
| 2023/0081665 | A1* | 3/2023 | Izumikawa | B63B 49/00 |
| | | | | 701/21 |
| 2023/0273026 | A1* | 8/2023 | Davis | G01C 21/20 |
| | | | | 701/21 |

FOREIGN PATENT DOCUMENTS

| | | | | |
|---|---|---|---|---|
| JP | 57207815 | A | * | 12/1982 |
| JP | H07248727 | A | * | 3/1994 |
| JP | H07248727 | A | | 9/1995 |
| JP | 08320650 | A | * | 12/1996 |
| JP | 20120022446 | A | | 2/2012 |
| JP | 2016169968 | A | | 9/2016 |
| JP | 2019121876 | A | | 7/2019 |
| JP | 2020036201 | A | | 3/2020 |

OTHER PUBLICATIONS

National Oceanic and Atmospheric Administration, "Tide Tables 2020—Europe and West Coast of Africa including the Mediterranean Sea", Oct. 1, 2019, 220 pages.
Japan Patent Office, Office Action Issued in Application No. 2021086530, dated Apr. 4, 2023, 8 pages.
Japan Patent Office, Office Action Issued in Application No. 2021086530, dated Aug. 9, 2023, 6 pages.
"Hong Kong Tidal Stream Prediction System," GovHK, Available Online at https://current.hydro.gov.hk/main/prediction_static.php, Retrieved on Aug. 10, 2023.

* cited by examiner

TIDAL CURRENT INFORMATION DISPLAY APPARATUS AND METHOD

CROSS-REFERENCE TO RELATED APPLICATIONS

The application claims priority under 35 U.S.C. § 119 to European Patent Application No. EP21158110.3, which was filed on Feb. 19, 2021, and Japanese Patent Application No. JP2021-086530, which was filed on May 21, 2021, and the entire disclosures each of which are hereby incorporated by reference.

BACKGROUND

Technical Field

The present disclosure mainly relates to a tidal current information display apparatus, and more specifically to displaying change in tidal current information with time for navigation of marine vessel.

Background of the Related Art

Tidal currents have been known to influence a course of the marine vessel on water. Vessel navigating personnel, for example, a captain, crew, or other navigating personnel on-board the marine vessel may be unaware of when and how each tidal current may influence the course of the marine vessel. For example, in waters where tidal currents may, or stated differently—are likely to, be encountered by the marine vessel, a position, direction and/or speed of the tidal current may be unknown by the vessel navigating personnel and consequently, the vessel navigating personnel may be forced to choose or elect a sub-optimal course of travel for the marine vessel in such waters. Depending on a severity of, or by simply encountering over a prolonged period of time, these tidal currents may contribute in negatively impacting a structural integrity and/or an operational performance of the marine vessel.

Some systems have been developed in the past to assist in the navigation of marine vessels. Usually, a geographical chart showing a chart of a predetermined area and a tidal current at each location within an area is provided from an external base through communication equipment. The information indicating the tidal current generally includes the measuring position and the direction and speed of the tidal current at the measuring position. A ship navigating in the above area can obtain information on the tidal current by using a communication means such as satellite communication. The obtained information is displayed on the navigation monitor of a vessel to help determine the vessel route.

It is to be noted, that the direction and speed of the tidal current usually change from moment to moment, and the obtained tidal current information includes information of different times even at the same position. However, it is complicated to display the tidal current information at the same position and different times on the same screen. It is difficult to visually catch a change of a tidal current for various future time instants, at the same position.

For the aforementioned reasons, there is a need for providing a system and method that facilitates displaying of change in tidal current information with time in a manner that also assist in the navigation of the marine vessel.

SUMMARY

In an aspect of the present disclosure, there is provided a tidal current information display apparatus for a movable body, for displaying tidal current information on a display screen. The tidal current information display apparatus includes a tidal current information receiving terminal configured to receive tidal current information including a position of a tidal current on a chart of a region including the movable body, and a plurality of predicted tidal current directions of the tidal current at said position at a corresponding plurality of time instants. The tidal current information display apparatus further includes a tidal current display data generation terminal configured to generate an indicator including a time scale determined according to the plurality of time instants, determine position of each predicted tidal current direction on the time scale at respective time instant, generate a plurality of symbols for respective positions on the time scale, each symbol indicating respective predicted tidal current direction at respective time instant, and output the indicator including the plurality of symbols to the display screen.

In another aspect of the present disclosure, there is provided an augmented reality (AR) navigation apparatus for a movable body, for superimposing tidal current information on an image displayed on a display screen. The AR navigation apparatus includes a tidal current information receiving terminal configured to receive tidal current information including a position of a tidal current on a chart of a region including the movable body, and a plurality of predicted tidal current directions of the tidal current at said position at a corresponding plurality of time instants. The AR navigation apparatus further includes a tidal current display data generation terminal configured to receive a display position of the tidal current on the display screen, generate an indicator including a time scale determined according to the plurality of time instants, wherein a direction of a reference axis of the time scale coincides with a vertical axis of the display screen, determine position of each predicted tidal current direction on the time scale at respective time instant, generate a plurality of symbols for respective positions on the time scale on the indicator, each symbol indicating respective predicted tidal current direction at respective time instant, and associate the indicator including the plurality of symbols with the display position of the tidal current on the display screen.

In an aspect of the present disclosure, there is provided a method for displaying tidal current information on a display screen. The method includes receiving tidal current information including a position of a tidal current on a chart of a region including the movable body, and a plurality of predicted tidal current directions of the tidal current at said position at a corresponding plurality of time instants, generating an indicator including a time scale determined according to the plurality of time instants, determining position of each predicted tidal current direction on the time scale at respective time instant, generating a plurality of symbols for respective positions on the time scale, each symbol indicating respective predicted tidal current direction at respective time instant, determining a direction of each symbol on the time scale, with respect to a reference axis of geographic information displayed on the display screen, and outputting the indicator including the plurality of symbols to the display screen.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of apparatuses, systems, and processes that are consistent with the subject matter.

DETAILED DESCRIPTION

Figure 1:
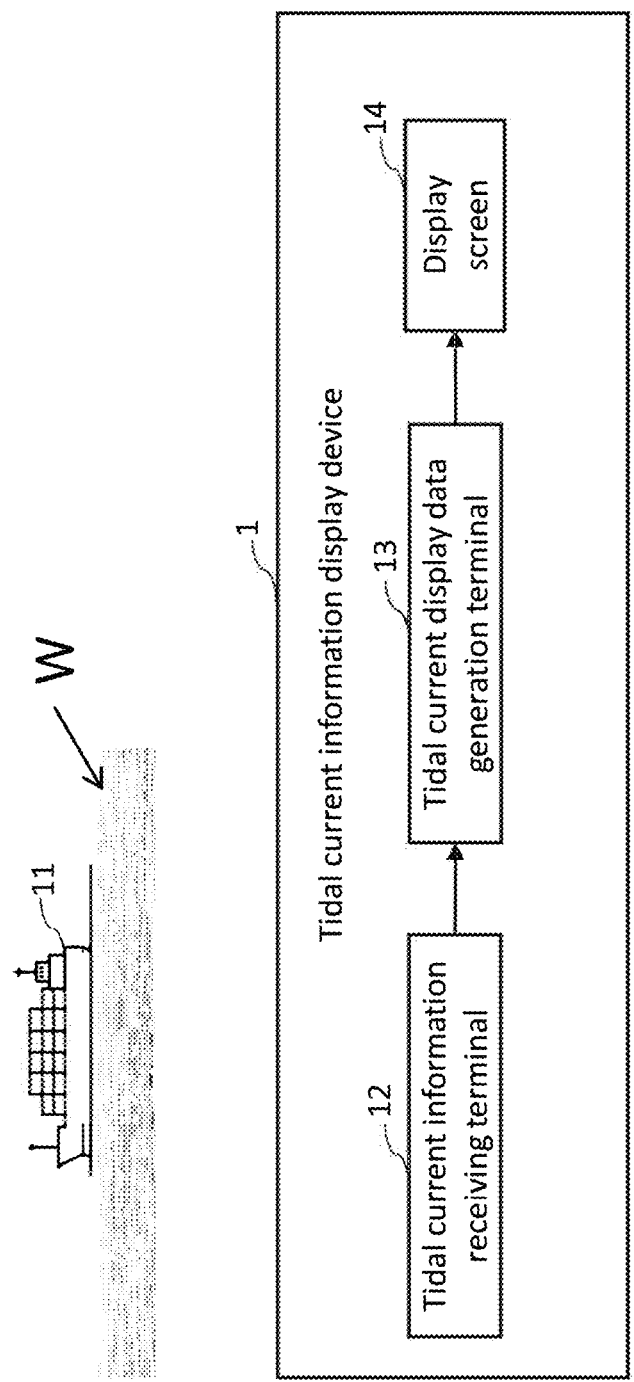
FIG. 1 is a block diagram illustrating an entire configuration of a tidal current information display apparatus for displaying tidal current information for a movable body, in accordance with a first embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
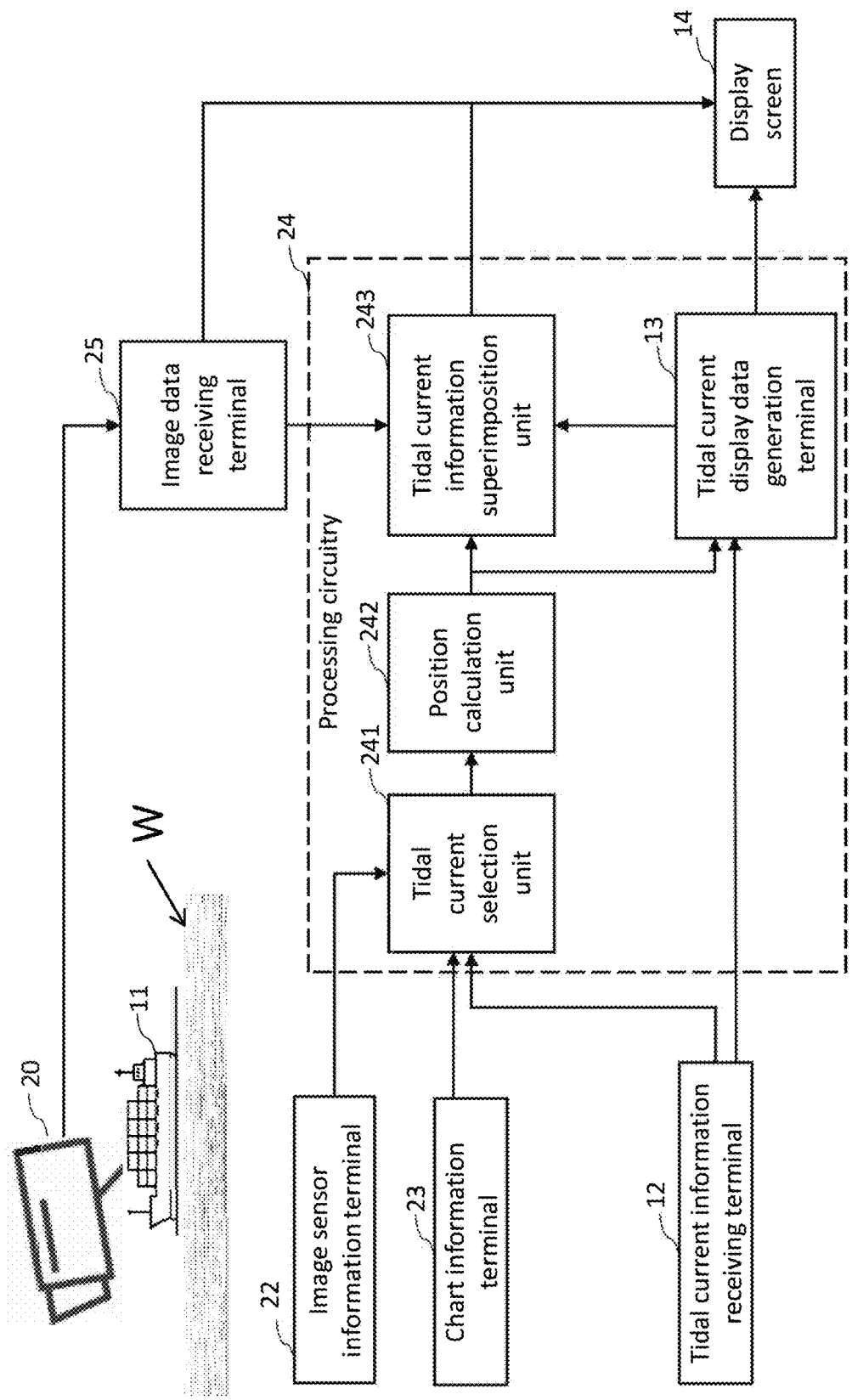
FIG. 2 illustrates an entire configuration of an AR navigation apparatus in which the tidal current information display apparatus may be used.

FIG. 1 is a block diagram illustrating a configuration of a tidal current information display apparatus 1 for displaying tidal current information for a movable body 11 (hereinafter also referred to as ship 11), in accordance with a first embodiment of the present disclosure. FIG. 2 illustrates an entire configuration of an AR navigation apparatus 2 in which the tidal current information display apparatus 1 may be used. In one embodiment of the present disclosure, the tidal current information display apparatus 1 is an integral part of the AR navigation apparatus 2. In another embodiment of the present disclosure, the tidal current information display apparatus 1 is an independent apparatus, that can be operably coupled to remaining components of the AR navigation apparatus 2. The AR navigation apparatus 2 would be explained in detail later.

Figure 3B:
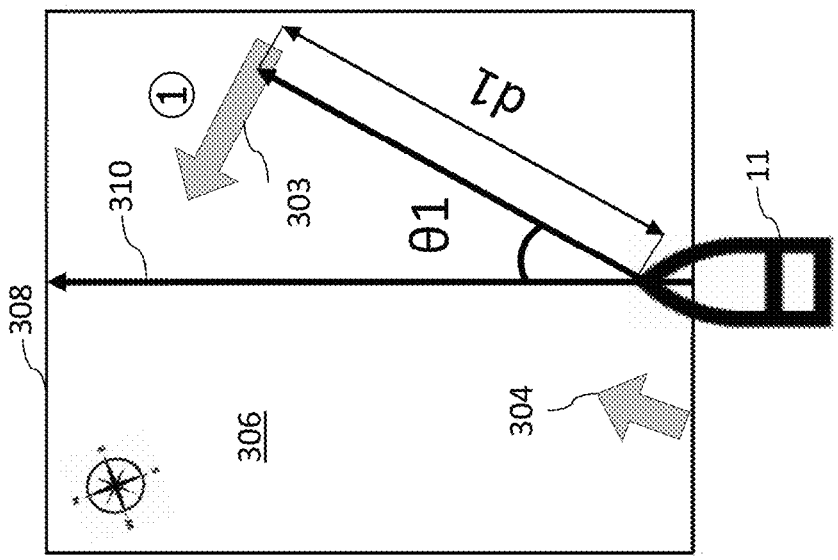
FIG. 3B illustrates a local chart of a sub-region having a reference axis in relation to a heading direction of the ship.
Figure 3A:
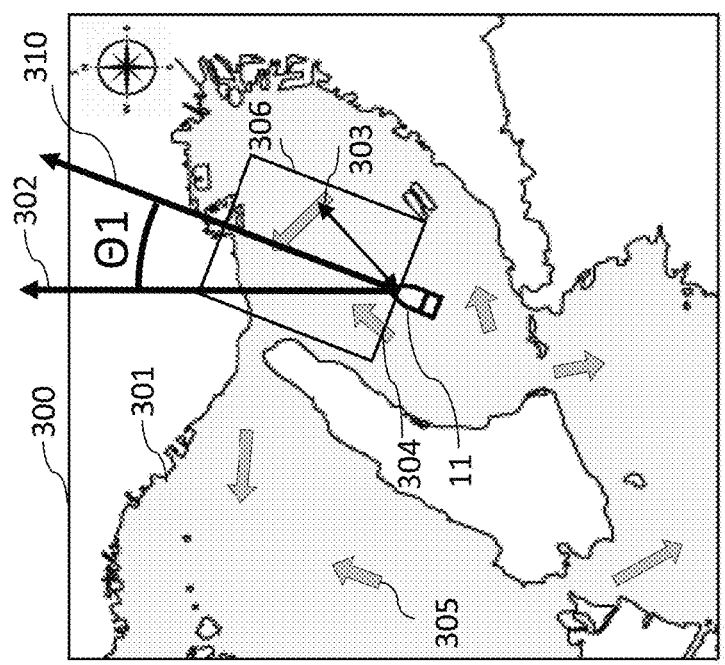
FIG. 3A illustrates an exemplary chart of a region including the movable body.

FIG. 3A illustrates an exemplary chart 300 of a region 301 including the ship 11. The chart 300 has a reference axis 302 with respect to a meridian plane (north direction facing upward). The chart 300 illustrates various tidal currents 303, 304 and 305 and a sub-region 306 surrounding the ship 11. FIG. 3B illustrates a local chart 308 (with ship bow facing upward) of the sub-region 306 having a reference axis 310 in relation to a heading direction of the ship 11. The reference axis 310 of the local chart 308 is at an angle ⊙1 with respect to the reference axis 302 of the chart 300.

Referring to FIGS. 1 and 3A, the tidal current information display apparatus 1 includes a tidal current information receiving terminal 12, a tidal current display data generation terminal 13, and a display screen 14. The tidal current information receiving terminal 12 receives and stores tidal current information pertaining to one or more tidal currents 303, 304 and 305 on a water surface W, in the region 301 including the ship. For each tidal current, the tidal current information may include a position on the chart 300, and a plurality of predicted directions and speeds at said position at a corresponding plurality of future time instants. The tidal current information receiving terminal 12 stores and receives the positions and the predicted future directions and speeds of the tidal currents in relation to a reference axis of the chart 300. Further, in the context of the present disclosure, it is assumed that with the passage of time, the position of each tidal current remains constant, and only their direction and speed may change. Thus, the direction and speed of a tidal current usually change from moment to moment, and the obtained tidal current information includes information of different times even at the same position.

In the context of the present disclosure, the tidal current information receiving terminal 12 obtains the tidal current information for the movable body 11, in advance at the time of departure or periodically after departure by means of communication, and stores the predicted directions and speeds at future time instants for each position of various tidal currents in a memory. The tidal current information receiving terminal 12 may be connected to an external communication equipment, for example, a land station, a Global Navigation Satellite System (GNSS) receiver, an Electronic Chart Display and Information System (ECDIS), an Automated Identification System (AIS) receiver, a radar apparatus etc. for receiving the tidal current information through wireless communication. Alternatively, the tidal current information receiving terminal 12 may receive tidal current information from one or more sensors attached to the movable body 11 which may predict tidal current information based on past measured values in addition to weather and surrounding oceanographic information.

For each tidal current, the tidal current display data generation terminal 13 generates an indicator including a time scale determined according to various time instants, then determine position of each predicted tidal current direction on the time scale at respective time instant, generate a plurality of symbols for respective positions on the time scale, each symbol indicating respective predicted tidal current direction at respective time instant, and output the indicator including the plurality of symbols to the display screen 14. The tidal current display data generation terminal 13 determines a direction of each symbol on the time scale, with respect to a reference axis of the geographical information displayed on the display screen 14.

Going forward, the tidal current information display apparatus 1 has been explained for generating and displaying tidal current information for the tidal current 303, however it would be apparent to one of ordinary skill in the art, that it is possible to generate and display tidal current information for other tidal currents of the region 301 in the similar manner.

Figure 4A:
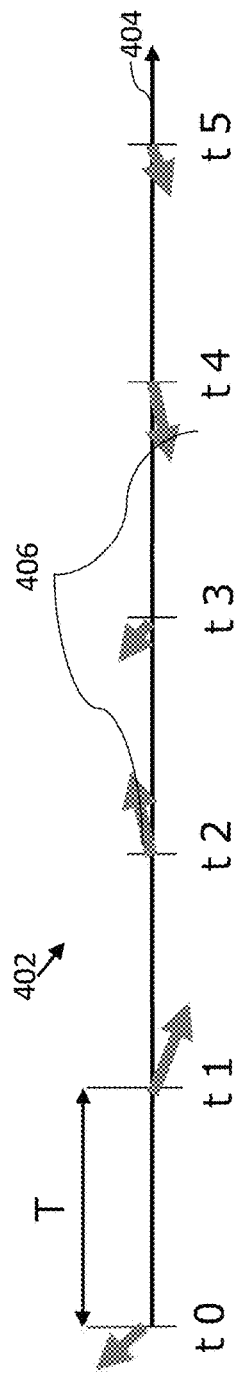
FIG. 4A illustrates a first type of indicator for indicating tidal current information.

Referring to FIGS. 1, 3A and 4A, the tidal current display data generation module 13 generates a first type of indicator 402 that includes a linear time scale 404 which is a straight line including various future time instants t1, t2, t3, t4, and t5 separated with a predefined time period T. The tidal current display data generation module 13 determines position of each predicted tidal current direction of the tidal current 303 on the time scale 404 at respective time instant, and generate a plurality of symbols 406 for respective positions on the time scale 404. Each symbol 406 indicates respective predicted tidal current direction at respective time instant, and is positioned on the straight line at respective time instant. The left end of the time scale 404 indicates the reference time t0 at which the movable body 11 is present, and the symbols 406 display tidal current information at each time instant after the lapse of the predefined time period T. The tidal current display data generation module 13 output the first type of indicator 402 including the plurality of symbols 406 to the display screen 14.

In one embodiment of the present disclosure, the tidal current display data generation terminal 13 determines a direction of each symbol 406 on the time scale 404, with respect to a reference axis 302 of the chart 300 for displaying the first type of indicator 402 on the chart 300 on the display screen 14. In another embodiment of the present disclosure, the tidal current display data generation terminal 13 determines a direction of each symbol 406 on the time scale 404, with respect to a reference axis 310 of the local chart 308 for displaying the first type of indicator 402 on the local chart 308 on the display screen 14.

Figure 4B:
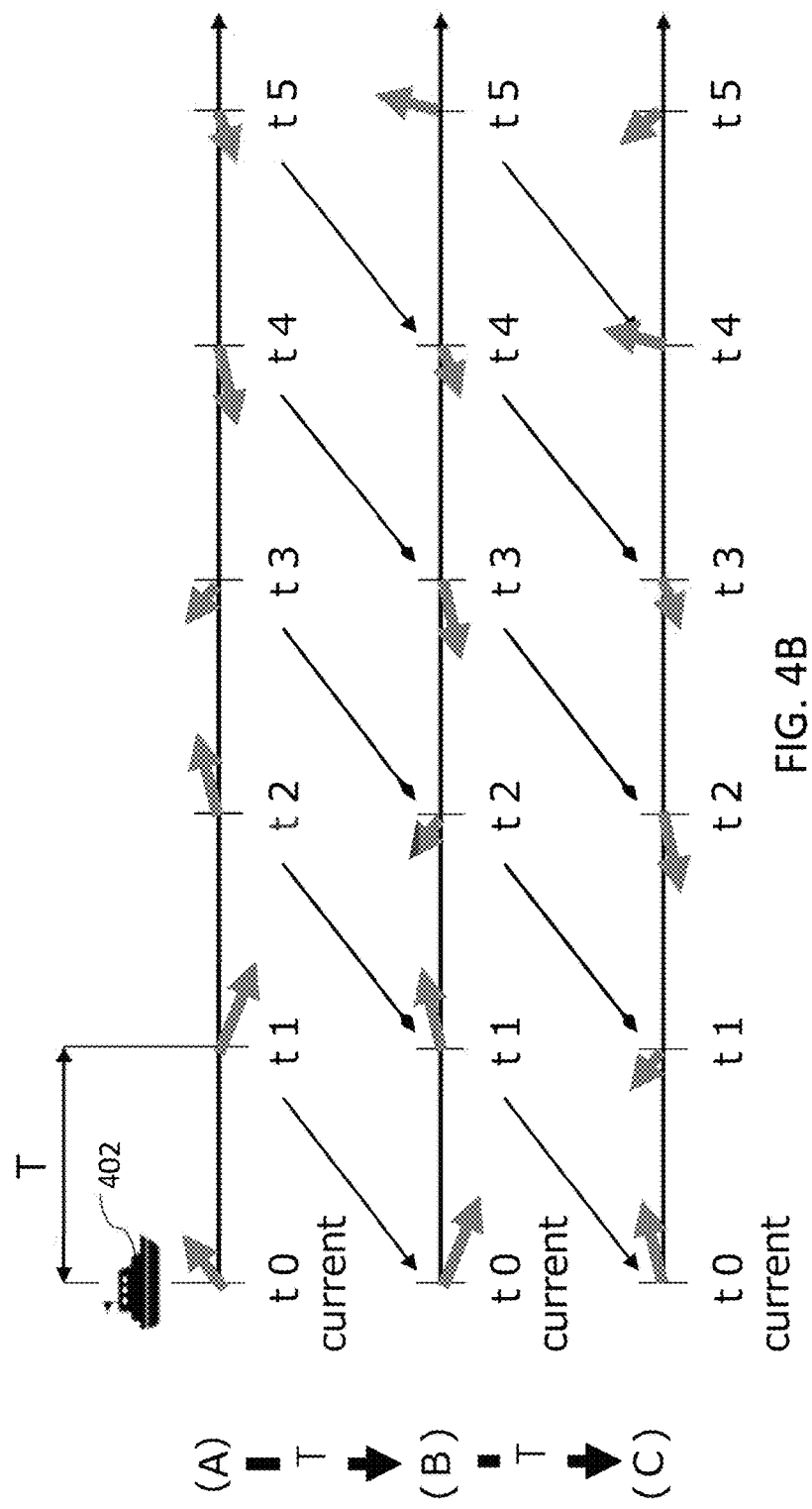
FIG. 4B illustrates movement of the symbols on the time scale of the first type of indicator.
Figure 5:
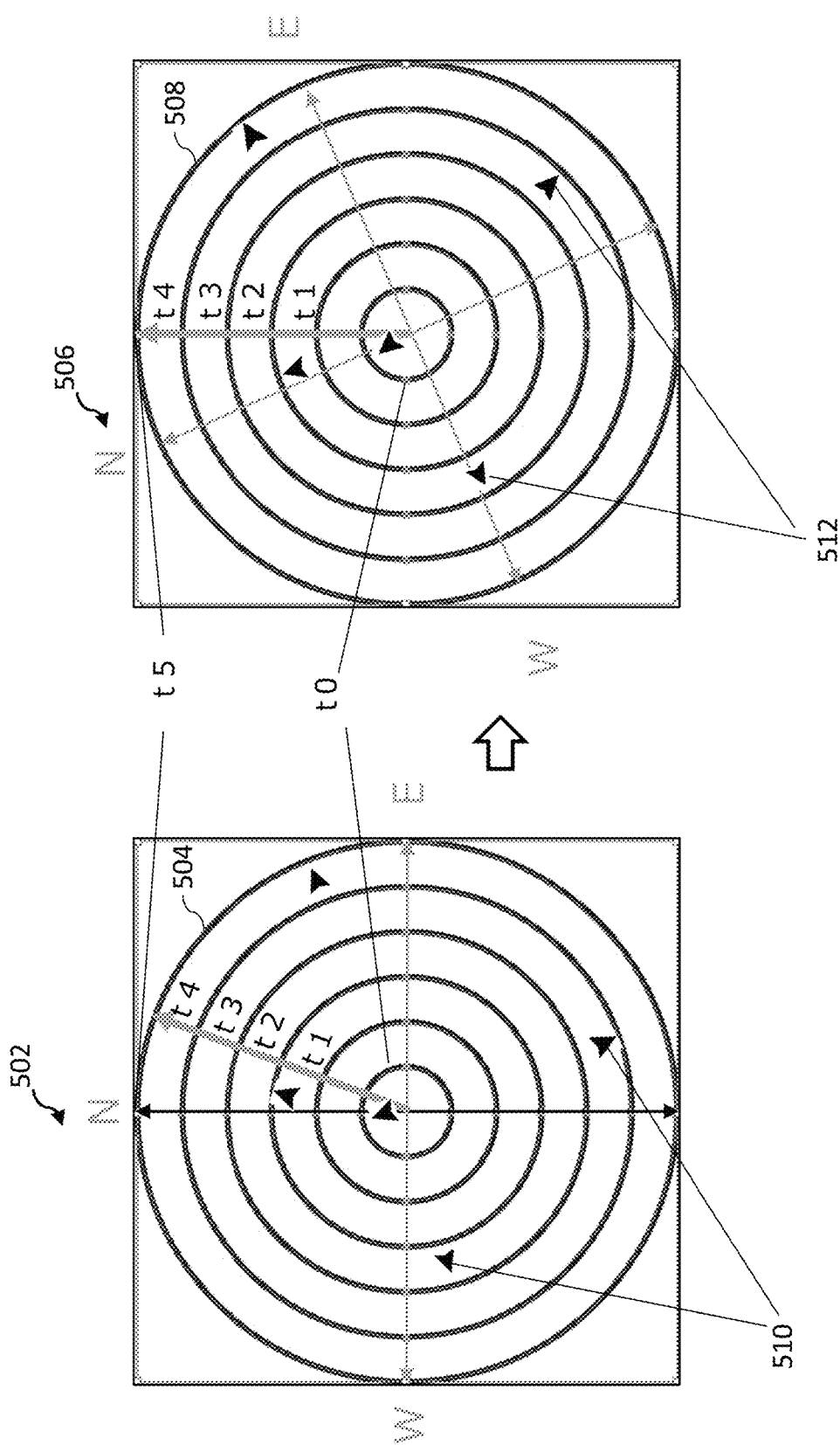
FIG. 5A illustrates a second type of indicator for indicating tidal current information on the chart.
FIG. 5B illustrates another second type of indicator for indicating tidal current information on the local chart.

FIG. 4B illustrates movement of the symbols 406 on the time scale 404 with time. As time passes, the symbols 406 displayed on the time scale 404 move to the left, and the present tidal current information is always displayed at the left end of the time scale 404. In an example, when the time T has elapsed, the symbol 406 displayed at t1 on the time scale A is displayed at a position t0 at the left end of time scale B. Further, when the period T has elapsed, the symbol 406 displayed at t2 on the time scale A is displayed at a position t0 at the left end of time scale C.

Referring to FIGS. 1, 3A, 3B, 5A, and 5B, the tidal current display data generation module 13 generates a second type of indicator 502 including a concentric circle type time scale 504 for displaying on the chart 300 on the display screen 14, and another second type of indicator 506 including a concentric circle type time scale 508 for displaying on the local chart 308 on the display screen 14. The second type of indicator 502 has a reference axis in relation to the reference axis 302 of the chart 300, whereas the another second type of indicator 506 has a reference axis in relation to the reference axis 310 of the local chart 308.

Each of the concentric circle type time scales 504 and 508 includes a plurality of concentric circles, in that radii of each concentric circle correspond to a time instant of the plurality of time instants t0-t5. The concentric circle with the smallest radius corresponds to the present time instant t0, and the concentric circle with the highest radius corresponds to the time instant t5.

In the second type of indicator 502, each symbol 510 is positioned on concentric circle of respective time instant, for indicating predicted tidal current direction of the tidal current 303 on the chart 300 at that time instant. The direction of each symbol 510 indicates the predicted direction of the tidal current 303 on the chart 300 at respective time instant.

In the another second type of indicator 506, each symbol 512 is positioned on concentric circle of respective time instant for indicating predicted tidal current direction of the tidal current 303 on the local chart 308 at that time instant. The direction of each symbol 512 indicates the direction of the tidal current 303 on the chart 308 at respective time instant.

Additionally, or optionally, the another second type of indicator 506 may be generated by rotating the second type of indicator 502 in an anti-clockwise direction by an angle between the reference axes 302 and 310.

Furthers, the symbols 510 and 512 move on respective concentric time scales 504 and 508 from outside to inside with the passage of time.

Figure 6:
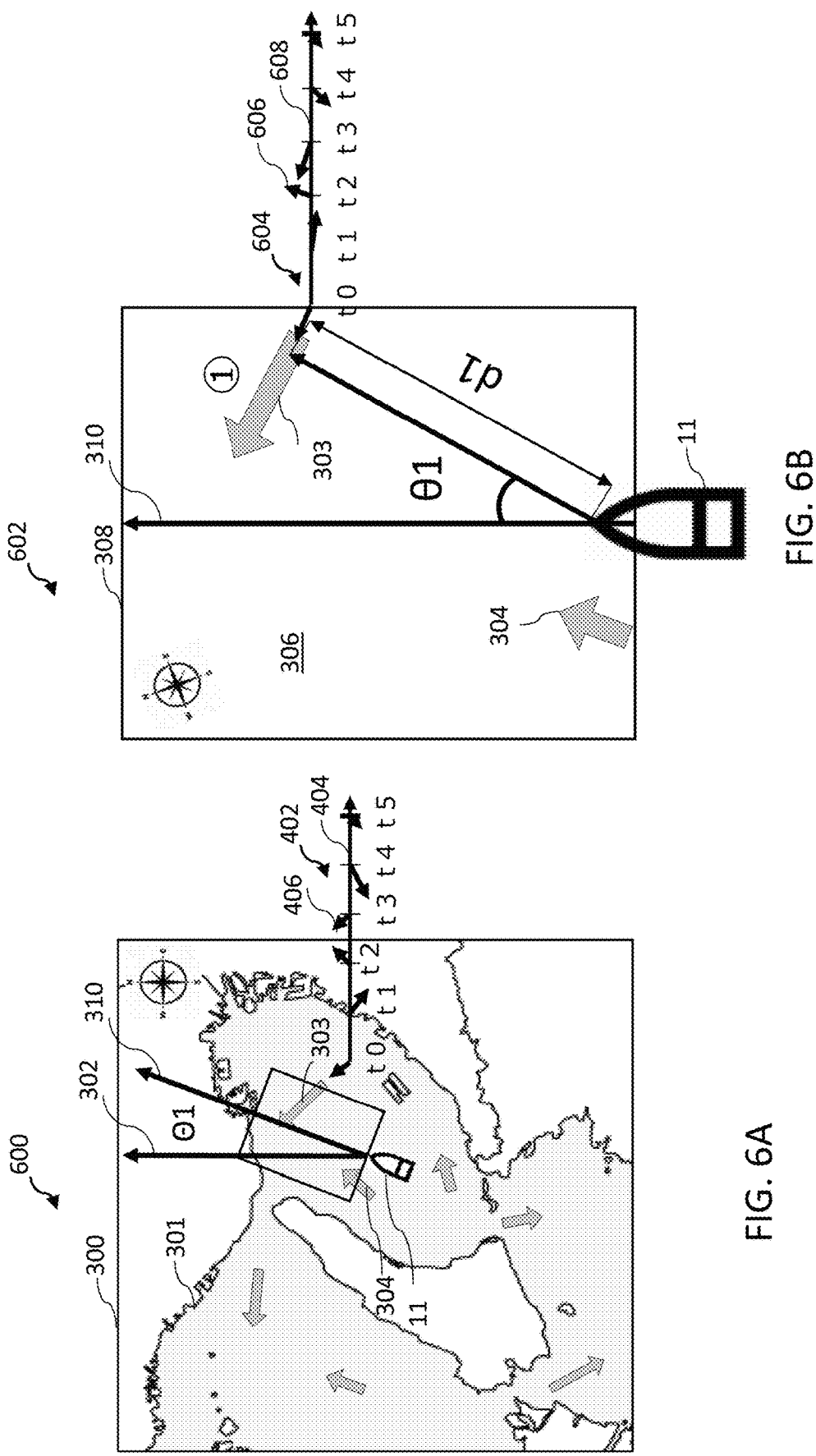
FIG. 6A illustrates a first display of the chart including the first type of indicator.
FIG. 6B illustrates a first display of the local chart including the another first type of indicator.

FIG. 6A illustrates a first display 600 of the chart 300 including the first type of indicator 402 for indicating predicted tidal current directions of the tidal current 303 at various time instants, in accordance with one embodiment of the present disclosure.

The display screen 14 receives and displays the chart 300, receives the first type of indicator 402 including the plurality of symbols 406, and displays the first type of indicator 402 on the chart 300, at the position of corresponding tidal current 303 on the chart 300. It is to be noted that a direction of each symbol 406 on the time scale 404 is determined with respect to a reference axis 302 of the chart 300. Also, the timescale 404 is displayed perpendicular to the reference axis 302. Although not shown, the display screen 14 may receive and store chart information to generate the first display 600 including the first type of indicator 402.

FIG. 6B illustrates a first display 602 of the local chart 308 including another first type of indicator 604 for indicating predicted tidal current directions of the tidal current 303 on the local chart 308 at various time instants, in accordance with one embodiment of the present disclosure.

The display screen 14 receives and displays a part of the chart 300 as the local chart 308, receives the another first type of indicator 604 including a plurality of symbols 606 on a linear time scale 608, and displays the another first type of indicator 604 on the local chart 308, at the position of tidal current 303 on the local chart 308. It is to be noted that a direction of each symbol 606 on the time scale 608 is determined with respect to a reference axis 310 of the local chart 308. Also, the time scale 608 is displayed perpendicular to the reference axis 310. Additionally, or optionally, the another first type of indicator 606 may be generated by rotating the first type of indicator 402 by an angle ☉ between the axes 302 and 310.

Additionally, or optionally, each of the symbols 406, 510, 512, and 606 is an arrow indicating corresponding predicted current direction of the tidal current 303. A characteristic of each symbol including a length of the arrow, a thickness of the arrow, and a color of the arrow is varied based on corresponding predicted speed of the tidal current 303. Thus, in respective time scale, a direction of the arrow at a time instant indicates a predicted current direction at that time instant, and a length of an arrow at a time instant may indicate the speed of the tidal current 303 at that time instant.

Figure 7:
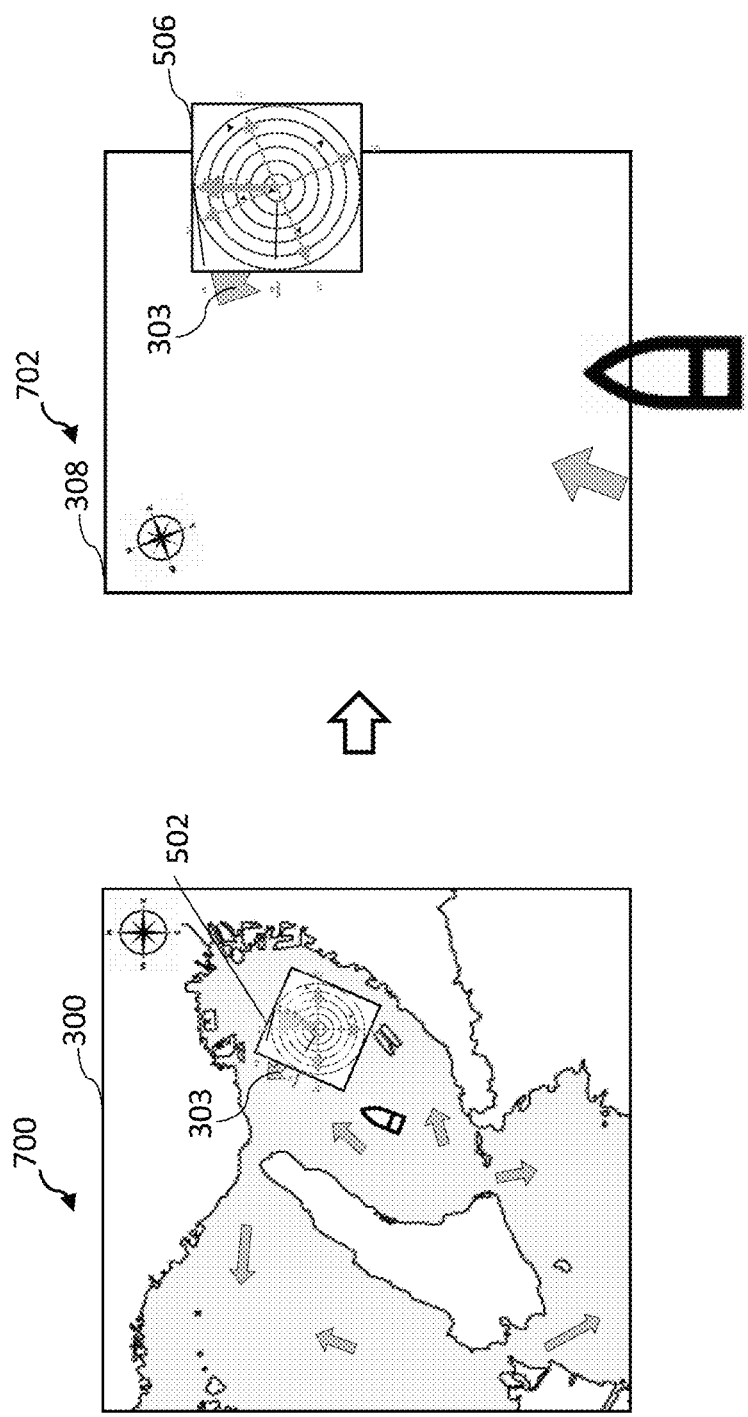
FIG. 7A illustrates a second display of the chart including the second type of indicator.
FIG. 7B illustrates a second display of the local chart including the another second type of indicator.

FIG. 7A illustrates a second display 700 of the chart 300 including the second type of indicator 502 for indicating predicted tidal current directions of the tidal current 303 on the chart 300 at various time instants. The display screen 14 receives and displays the chart 300, receives the second type of indicator 502 including the plurality of symbols 510, and displays the second type of indicator 502 on the chart 300, at the position of tidal current 303 on the chart 300 for indicating predicted tidal current directions of the tidal current 303 on the chart 300 at various time instants.

FIG. 7B illustrates another display 702 of the local chart 308 including another second type of indicator 506 for indicating predicted tidal current directions of the tidal current 303 on the local chart 308 at various time instants. The display screen 14 receives and displays a part of the chart 300 as the local chart 308, receives the another second type of indicator 506 including a plurality of symbols 512, and displays the another second type of indicator 506 on the local chart 308, at the position of tidal current 303 on the local chart 308 for indicating predicted tidal current directions of the tidal current 303 on the local chart 308 at various time instants.

It is to be noted that the position of each symbol on the concentric-circle timescale for indicating tidal current direction and speed can be grasped more intuitively and visually by seeing where on the circumference there is a symbol indicating the tidal current, as compared to the linear time scale. The linear time scale requires less space in the vertical direction in the display. However, it requires a relatively large space in the horizontal direction to prevent symbols from overlapping. On the other hand, the concentric circle time-scale can be displayed in a relatively small space in both the vertical and the horizontal directions.

Although, the linear time scales 404 and 608, and concentric circle time scales 504 and 508 are being illustrated herein for the display of predicted tidal current directions of the tidal current 303 at various time instants, it would be apparent to a person of ordinary skill in the art, that other configurations of the time scales are possible as well.

Figure 8:
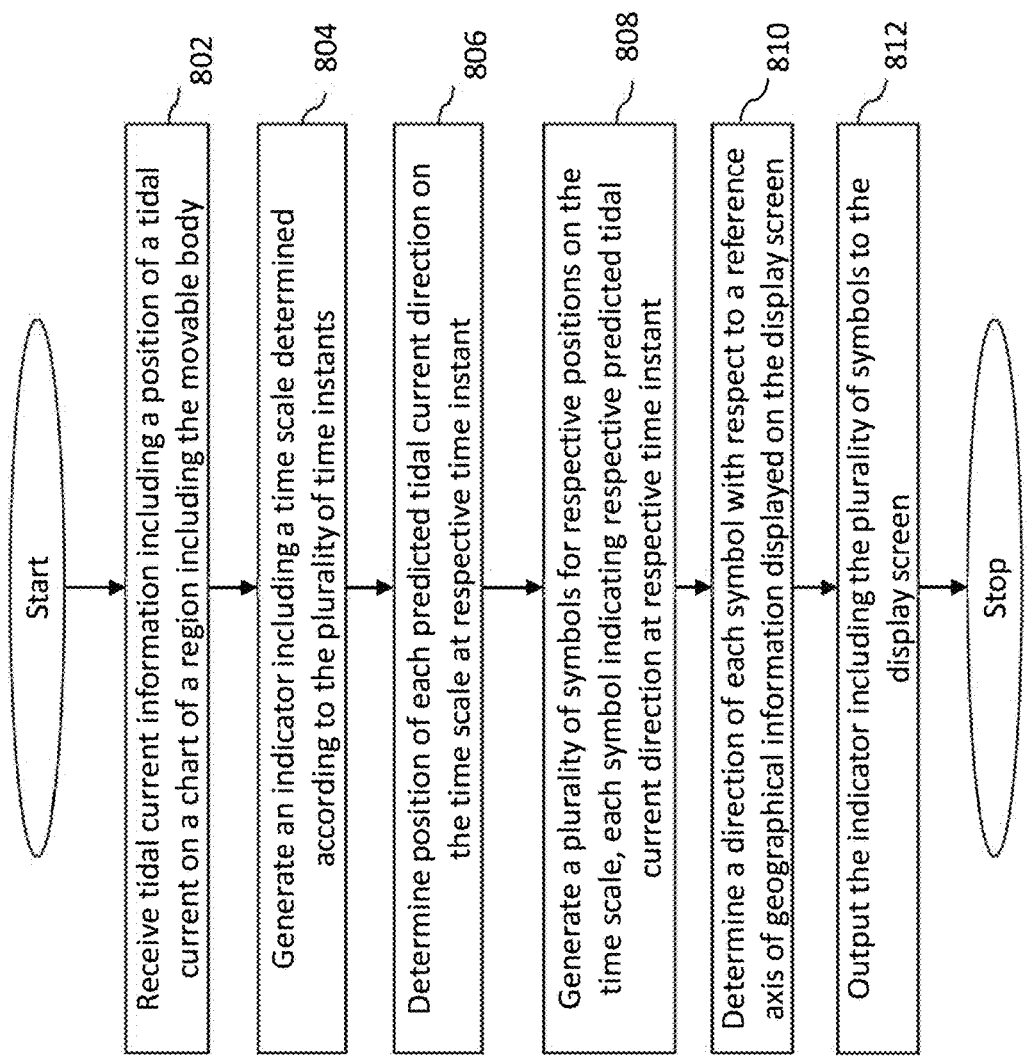
FIG. 8 is a flowchart illustrating a method for displaying tidal current information, in accordance with an embodiment of the present disclosure.

FIG. 8 is a flowchart of a method for displaying tidal current information on the display screen 14, in accordance with an embodiment of the present disclosure. The method has been explained with reference to FIG. 1.

At step 802, the tidal current information receiving terminal 12 receives tidal current information including a position of a tidal current 303 on a chart 300 of a region 301 including the movable body 11, and a plurality of predicted tidal current directions of the tidal current 303 at said position at a corresponding plurality of time instants.

At step 804, the tidal current display data generation terminal 13 generates an indicator including a time scale determined according to the plurality of time instants.

At step 806, the tidal current display data generation terminal 13 determines position of each predicted tidal current direction on the time scale at respective time instant.

At step 808, the tidal current display data generation terminal 13 generates a plurality of symbols for respective positions on the time scale, each symbol indicating respective predicted tidal current direction at respective time instant.

At step 810, the tidal current display data generation terminal 13 determines a direction of each symbol with respect to a reference axis of geographical information displayed on the display screen 14.

At step 812, the tidal current display data generation terminal 13 outputs the indicator including the plurality of symbols to the display screen 14.

Next, the entire configuration of the AR navigation apparatus 2 is explained in detail with reference to FIG. 2. The AR based navigation apparatus 2 may be located on-board the ship 11, and autonomously, or at least semi-autonomously facilitates a user to, navigate the ship 11 across the sea. The AR based navigation apparatus 2 enables the user to navigate the ship 11 by superimposing live tidal current information on live images of surroundings of the ship in a manner which is easy for a user to comprehend. The AR based navigation apparatus 2 may also be connected to variety of peripheral apparatuses including, but not limited to, a keyboard and a mouse which the user may operate for performing various functions consistent with the present disclosure.

The AR navigation apparatus 2 includes an image sensor 20 attached to the movable body 11. The image sensor 20 (hereinafter also referred to as camera 20) may be attached to the ship 11. The camera 20 may be configured as, for example, a limited-viewing angle or a wide-angle video camera which images the water surface W in the vicinity, or around at least a portion of the perimeter of the ship 11. This camera 20 may have a live output function, capable of generating video data (image data) as the imaged result on real time, and outputting it to an image data receiving terminal 25 for displaying on the display screen 14. The camera 20 may be installed in the ship 11 so that an imaging direction generally faces onto the water surface W forward of the hull. The camera 20 may be attached to the ship 11 through a rotating mechanism (not illustrated) and, therefore, the imaging direction can be changed in a given angle range on the basis of the hull of the ship 11. Moreover, as the height and the posture of the ship 11 may change due to waves etc., the height h of the camera 20 may change with respect to the water surface W.

The AR navigation apparatus 2 includes the display screen 14 that may be configured as, for example, a display screen that forms part of a navigation assisting apparatus to which a ship operator who operates the ship 11 refers. However, the display screen 14 is not limited to the above configuration, and, for example, it may be a display screen for a portable computer which is carried by a ship operator's assistant who monitors the surrounding situation from the ship 11, a display screen for a passenger to watch in the cabin of the ship 11, or a display part for a head mounted display, such as a wearable glass, worn by a passenger. In one embodiment of the present disclosure, the display screen 14 is configured to display image data generated by the image data receiving terminal 25.

The AR navigation apparatus 2 further includes an image sensor information terminal 22, a chart information terminal 23, the tidal current information receiving terminal 12, a processing circuitry 24, and the image data receiving terminal 25. The processing circuitry 24 includes a tidal current selection unit 241, a position calculation unit 242, a tidal current information superimposition unit 243, and the tidal current display data generation module 13. In the context of the present disclosure, the processing circuitry 24 includes a processor, computer, microcontroller, or other circuitry that controls the operations of various components such as the operation panel, and the memory. The processing circuitry 24 may execute software, firmware, and/or other instructions, for example, that are stored on a volatile or non-volatile memory, or otherwise provided to the processing circuitry 24.

The image sensor information terminal 22 receives and stores image sensor information including a position and an azimuthal orientation of the image sensor 20 with respect to the reference axis 302 of the chart 300. The image sensor 20 is fixedly attached to the ship 11, and therefore, the position of the image sensor 20 is assumed to be similar to a position of the ship 11, and a heading direction of the ship 11 may be used to determine the azimuthal orientation of the image sensor 20, and vice versa.

The chart information terminal 23 receives and stores the chart 300 of the region 301 including the ship 11 based on electronic nautical chart information stored beforehand.

The tidal current selection unit 241 receives the chart 300 of the region 301 from the chart information terminal 23, and an azimuth and position of the image sensor 20 from the image sensor information terminal 22, and determines the sub-region 306 of the chart 300, based on the field of view (FoV) of the image sensor 20. The tidal current selection unit 241 selects the first and second tidal currents 303 and 304 in the sub-region 306 based on the tidal current information from the tidal current information receiving terminal 12. Although two tidal currents are shown to be selected herein, it would be apparent to one of ordinary skill in the art that the tidal current selection unit 241 may select more than or less than two tidal currents in the sub-region 306.

The position calculation unit 242 calculates display positions of each of the selected tidal currents 303 and 304 on the display screen 14 based on the image sensor information. More specifically, the position calculation unit 242 calculates display coordinates of the tidal currents 303 and 304 on an image to be displayed on the display screen 14.

Figure 9:
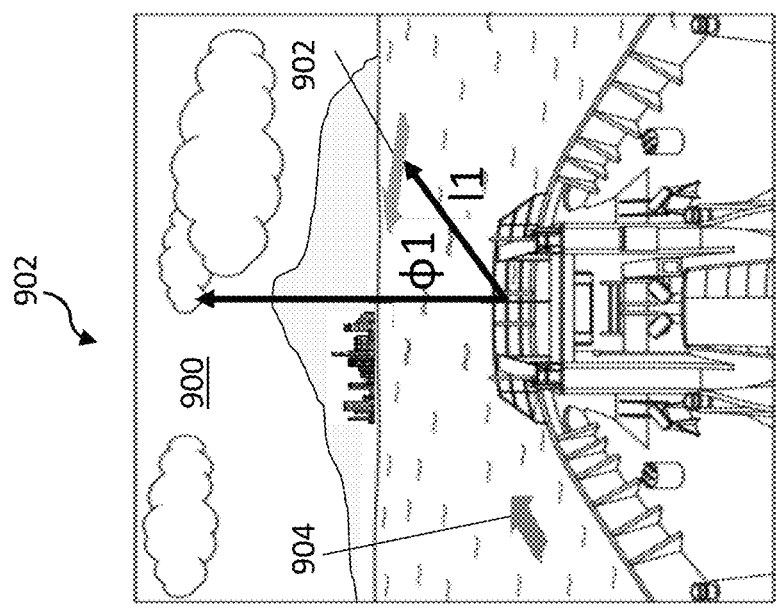
FIG. 9 illustrates a superimposed image generated for indicating position information of a tidal current.

Referring to FIGS. 2 and 9, the tidal current superimposition unit 243 receives an image 900 of surroundings of the ship 11 from the image data receiving terminal 25, and generate display symbols 902 and 904 corresponding to the display positions of the tidal currents 303 and 304 on the display screen 14. The tidal current superimposition unit 243 then superimpose the display symbols 303 and 304 on the image 900 at respective display positions, to generate a superimposed image 902.

Going forward, the AR navigation apparatus 2 has been explained for generating and displaying tidal current information for the tidal current 303, however it would be apparent to one of ordinary skill in the art, that it is possible to generate and display tidal current information for other tidal currents of the region 301 in the similar manner.

Referring back to FIG. 2, the tidal current display data generation terminal 13 receives a display position of the tidal current 303 on the display screen 14 from the position calculation unit 242, and a plurality of predicted tidal current directions of the tidal current 303 at various time instants from the tidal current information receiving terminal 12. Thereafter, the tidal current display data generation terminal 13 generates an indicator including a time scale determined according to the plurality of time instants, and associate the indicator including the plurality of symbols with the display position of the tidal current 303 on the display screen 14.

In one embodiment of the present disclosure, the indicator is a first type of indicator (402, 604) that includes a linear time scale, perpendicular to the vertical axis of the display screen 14.

In another embodiment of the present disclosure, the indicator is a second type of indicator (502, 506) including concentric circle time scale, with a reference axis coinciding with the vertical axis of the display screen 14. By making the axes coincide, the direction of the tidal current 303 indicated by the tidal current information is matched with the orientation of the image sensor 20 that captures the image.

In yet another embodiment of the present disclosure, the indicator includes a concentric ellipse type time scale illustrated with reference to FIG. 10.

Figure 10:
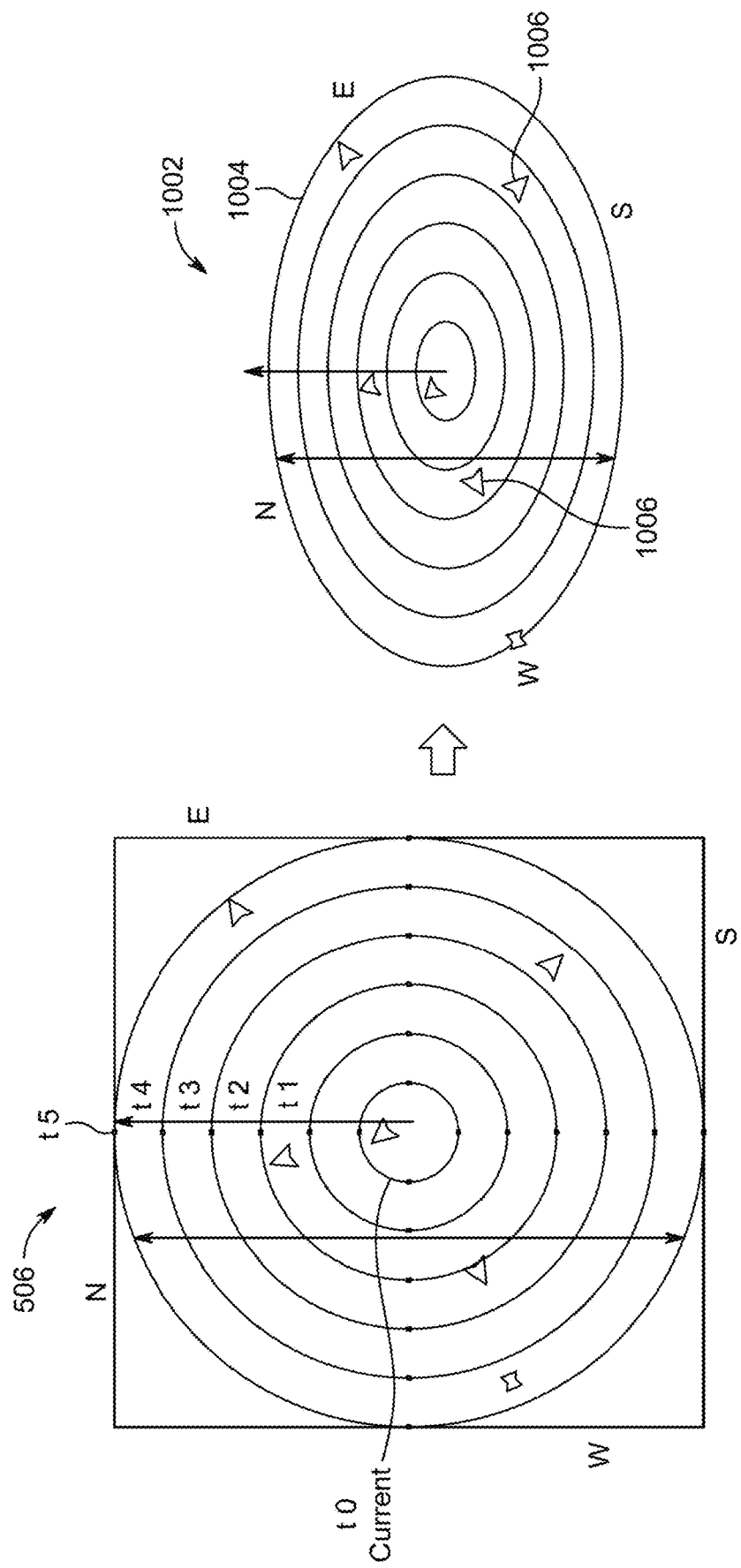
FIG. 10 illustrates a third type of indicator for indicating tidal current information on the display screen.

FIG. 10 illustrates a third type of indicator 1002 for indicating predicted current directions of the tidal current 303 on the display screen 14 at various time instants.

The third type of indicator 1002 includes a concentric ellipse type time scale 1004 having a minor axis coinciding with the vertical axis of the display screen 14. The concentric ellipse type time scale 1004 includes a plurality of concentric ellipses, in that radii of each concentric ellipse correspond to a time instant of the plurality of time instants. The concentric ellipse type time scale 1004 includes symbols 1006, each positioned on a circumference of respective concentric ellipse at a position corresponding to predicted tidal current direction. The position of each symbol 1006 indicates a predicted direction of the tidal current 303 at respective time instant, on the display screen 14.

Additionally, or optionally, the third type of indicator 1002 may be generated from the another second type of indicator 506 by subjecting the another second type of indicator 506 to coordinate transformation in the horizontal direction. This coordinate transformation can be accurately performed depending on a depression angle of the image sensor 20 attached to the hull and its height h from the water surface W. It is easier to grasp the state of the tidal current 303 by tilting the another second type of indicator 506 to the horizontal plane at an approximate angle to make the third type of indicator 1002 parallel to the sea surface in the image captured by the image sensor 20.

Figure 11A:
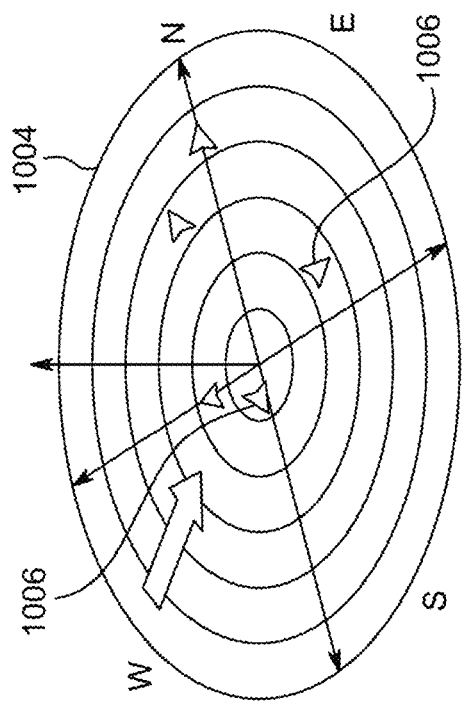
FIGS. 11A and 11B illustrate the movement of the symbols of the third type of indicator with time.
Figure 11B:
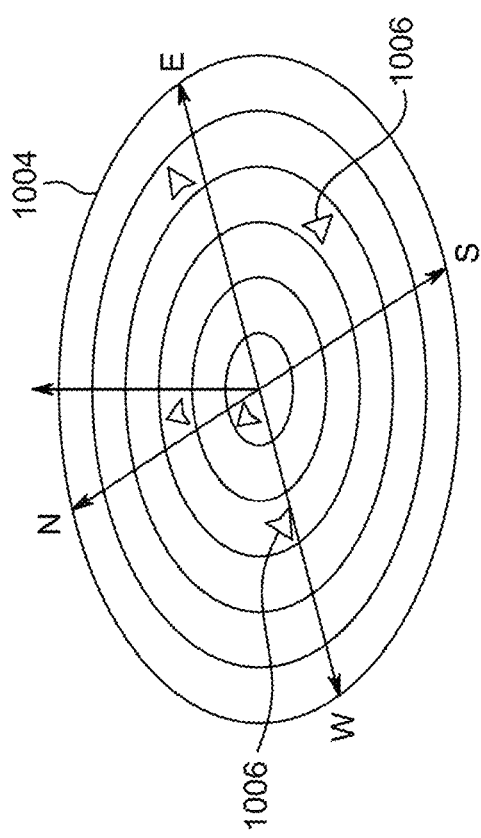

FIGS. 11A and 11B illustrates the movement of the symbols 1006 of the concentric ellipse time scale 1004 with time. FIG. 11A illustrates a state of the concentric ellipse time scale 1004 at a current time instant, and FIG. 11B illustrates a state of the concentric ellipse time scale 1004 at a next time instant. The symbols 1006 move from outside to inside with the passage of time. More specifically, if the time instants corresponding to the concentric ellipses are separated by a predefined time period T, then at the end of each predefined time period, each symbol moves one step closer to the center of the concentric ellipse time scale 1004.

Figure 12B:
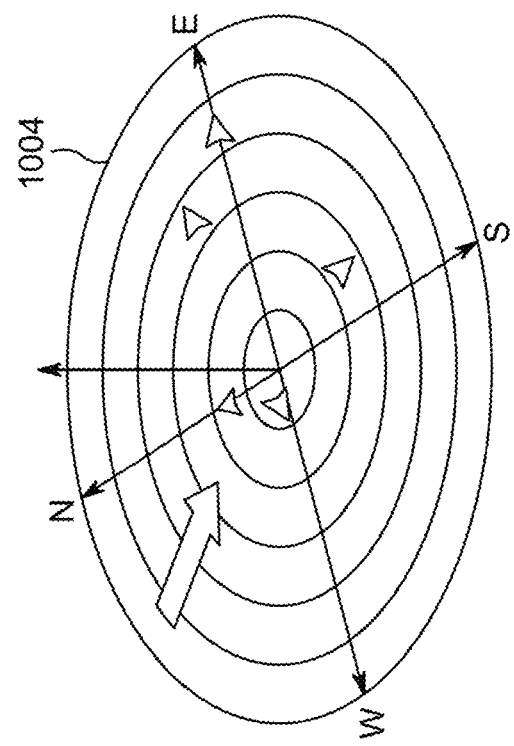
FIG. 12B illustrate the third type of indicator in a state, in which symbols are determined based on tidal current speeds.
Figure 12A:
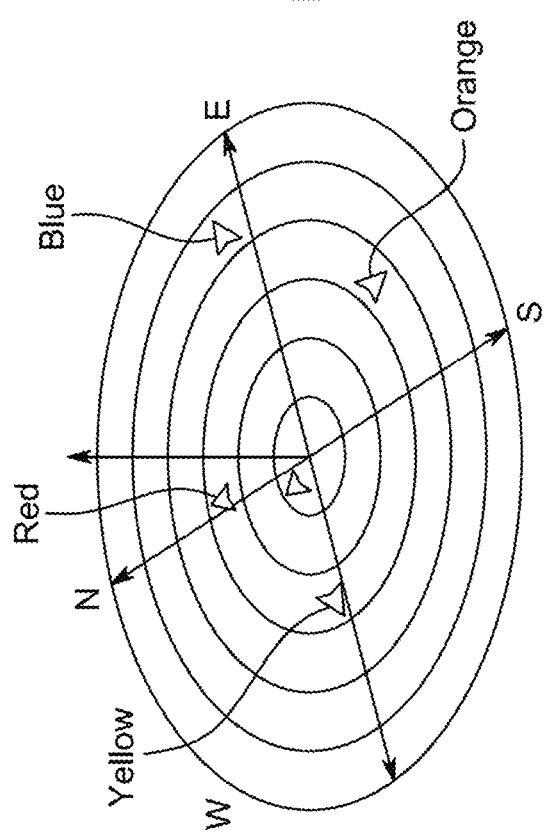
FIG. 12A illustrate the third type of indicator in a state, in which symbols indicating tidal current information at respective time instants are colored.

FIG. 12A illustrates the concentric ellipse time scale 1004 in a state, in which symbols 1006 indicating tidal current information at respective time instants are colored according to their respective speeds. FIG. 12B illustrates the concentric ellipse time scale 1004 in a state in which symbol sizes or figures, for example their lengths or widths, thereof are determined based on respective speeds.

Each symbol 1006 is an arrow indicating corresponding predicted current direction of the tidal current 303 on the display screen 14. A characteristic of each symbol 1006 including a length of the arrow, a thickness of the arrow, and a color of the arrow is varied based on corresponding predicted speed of the tidal current 303. For instance, to indicate a weak (slow-speed) tidal current on the image, a short or thin sized arrow may be used. Further, such arrow may be rendered with the use of a green or yellow color. Alternatively, to indicate a strong (high-speed) tidal current on the image, a long or thick sized arrow may be used. Additionally, or optionally, the long and/or thick sized arrow may be further rendered graphically with the use of, for example, a red color. Additionally, the symbols 1006 may be generated based on, and to indicate, depths of respective tidal currents. With respect to the foregoing explanation of the symbols, the characteristics of the symbols 1006 are not limited to any specific shape, size, or color. These characteristics, that is, the shapes, sizes, and colors may be varied to suit one or more maritime code requirements and/or other application specific requirements.

Referring back to FIG. 2, the tidal current superimposition unit 243 receives the indicator such as the third type of indicator 1002 from the tidal current display data generation terminal 13, including the plurality of symbols 1006. The third type of indicator 1002 is associated with a display position of the tidal current 303 on the display screen 14.

Referring to FIGS. 2, 9, and 10, the tidal current superimposition unit 243 superimpose the third type of indicator 1002 on the superimposed image 900 at a position above the display symbol 902 on the display screen 14 to generate a final superimposed image, and outputs the final superimposed image to the display screen 14 for displaying thereof.

Figure 13A:
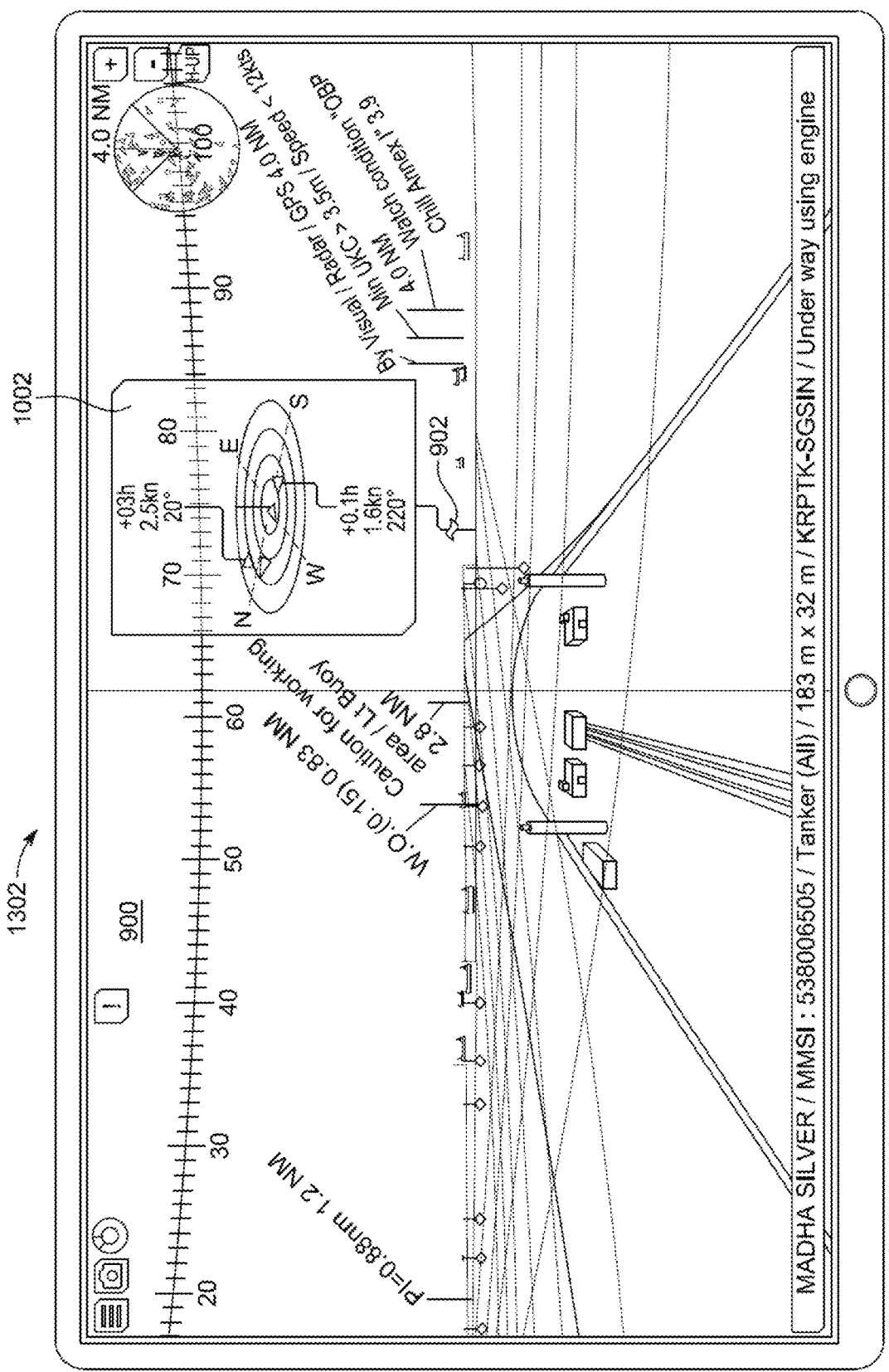
FIGS. 13A and 13B illustrate the exemplary final superimposed images displayed on the display screen for indicating tidal current information.

FIG. 13A illustrates an exemplary final superimposed image 1302 displayed on the display screen 14. In this image 1302, the third type of indicator 1002 indicates the direction of the tidal current, and is provided in four stages in a concentric circle manner from the center to the outside, and the outward circle indicates the time ahead. The final superimposed image 1302 includes the display symbol 902 which indicates the existence of tidal current information for respective tidal current on that display position. When the display symbol 902 is selected by a pointing apparatus (such as a mouse, a trackball, or a touch panel), the indicator 1002 is displayed at the upper part of the display symbol 902 with a frame. The user can hide the indicator 1002 by selecting the display symbol 902 again, and thus tidal current information is selectively displayed in accordance with a user's operation. The information in the frame may indicate an orientation by a triangle arrow and a numerical value, and a speed by a numerical value.

Figure 13B:
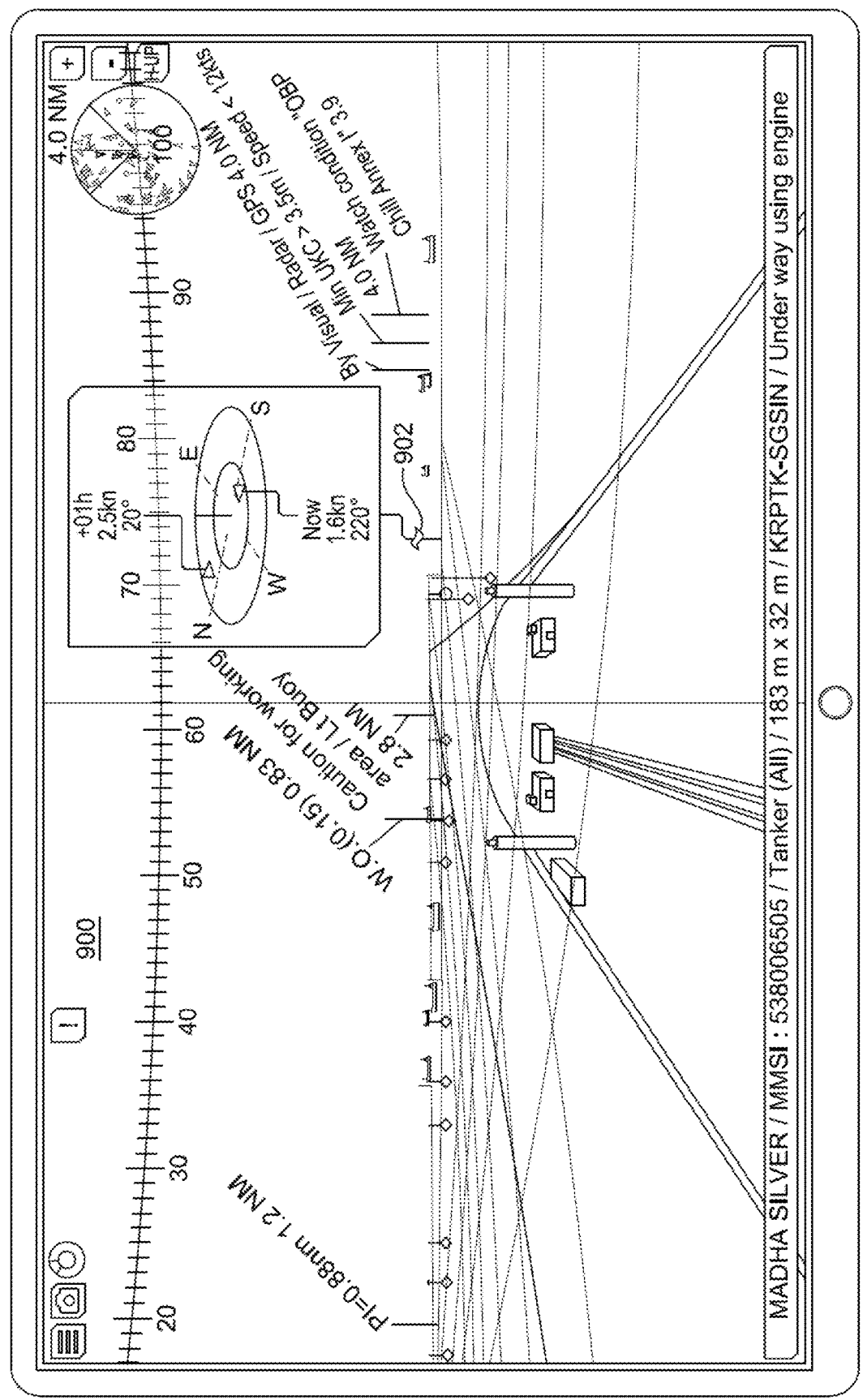

FIG. 13B illustrates another exemplary final superimposed image 1304 that includes two concentric ellipses in the third type of indicator 1002. In this simplified embodiment, even though the time information being displayed is reduced, it is simple and easy to use, and display numerical values without selecting an arrow each time.

Additionally, or optionally, the tidal current display data generation terminal 13 outputs the indicator 1002 to the display screen 14 directly, instead of outputting to the tidal superimposition unit 243. In such case, the superimposed image 900 is displayed on the display screen 14, and the indicator 1002 is displayed as a sub-display on the same display screen 14. The sub-display may have a reference axis in relation to the heading direction of the movable body 11. The indicator 1002 is associated with the tidal current 303 displayed on the display screen 14. When the indicator 1002 is displayed on the sub-display on the display screen 14, the display symbol 902 indicating position of the tidal current 303 may be associated with the sub-display by a pointer or the like.

Alternatively, the display screen 14 displays the superimposed image 900 on the display screen 14, and the indicator 1002 on another display screen. The another display screen may have a reference axis in relation to the heading direction of the movable body 11. The another display screen may be identified by an identification number corresponding to the indicator 1002.

The problem of not being able to visually capturing the change in direction and speed of a tidal current with time is solved by generating and displaying symbols indicating tidal current direction of a tidal current at various time instants, on a timescale. Such symbols may also be superimposed on an image of surroundings of a ship by aligning the position and direction of the tidal current with the surface azimuth and position of the sea surface of the camera image, to enable a user to visually grasp how the tidal current information changes with time at the same position, capture the state of the tidal current on the sea surface, and navigate the ship accordingly.

Various embodiments of the present disclosure facilitate to visually and intuitively capture the position, direction and speed of the tidal current with time when the tidal current information is superimposed on the image of surroundings of the ship.

Further, the present disclosure is applicable not only to the ship which travels on the sea, but may also be applicable to arbitrary water-surface movable bodies which can travel, for example, the sea, a lake, or a river.

Many modifications and modifications can be added to the embodiments described above, and their elements should be understood as being among other acceptable examples. All such modifications and modifications are intended to be included within the scope of the present disclosure and are protected by the following claims.

What is claimed is:

1. A tidal current information display apparatus for a movable body, for displaying tidal current information on a display screen, comprising:
   a tidal current information receiving terminal configured to receive tidal current information including a position of a tidal current on a chart of a region including the movable body, and a plurality of predicted tidal current directions of the tidal current at said position at a corresponding plurality of time instants; and
   processing circuitry configured to:
   generate an indicator including a time scale determined according to the plurality of time instants;
   determine position of each predicted tidal current direction on the time scale at respective time instant;
   generate a plurality of symbols for respective positions on the time scale, each symbol indicating respective predicted tidal current direction at respective time instant; and
   output the indicator including the plurality of symbols to the display screen.

2. The tidal current information display apparatus of claim 1, wherein the time scale is a straight line including the plurality of time instants separated by a predefined time period, and each symbol is positioned on the straight line at respective time instant.

3. The tidal current information display apparatus of claim 1, wherein the time scale is a concentric circle type time scale including a plurality of concentric circles, in that radii of each concentric circle correspond to a time instant of the plurality of time instants, and each symbol is positioned on a circumference of respective concentric circle at a position corresponding to predicted tidal current direction.

4. The tidal current information display apparatus of claim 1, wherein the position of each symbol moves over time on the timescale.

5. The tidal current information display apparatus of claim 1, wherein the processing circuitry is configured to determine a direction of each symbol on the time scale, with respect to a reference axis of geographic information displayed on the display screen.

6. The tidal current information display apparatus of claim 1 further comprising:
the display screen configured to:
receive and display the chart;
receive the indicator including the plurality of symbols; and
display the indicator on the chart, at the position of corresponding tidal current on the chart, wherein a direction of each symbol on the indicator is determined with respect to a reference axis of the chart.

7. The tidal current information display apparatus of claim 1 further comprising:
the display screen configured to:
generate a part of the chart as a local chart based on a position and an azimuth of the movable body, wherein the local chart has a reference axis as the heading direction of the movable body;
receive the indicator including the plurality of symbols; and
display the indicator on the local chart, at the position of corresponding tidal current on the local chart, wherein a direction of each symbol on the indicator is determined with respect to a reference axis of the local chart.

8. The tidal current information display apparatus of claim 1, wherein:
the tidal current information further includes a plurality of predicted speeds of the tidal current at corresponding plurality of time instants.

9. The tidal current information display apparatus of claim 8, wherein each symbol is an arrow indicating corresponding predicted current direction of the tidal current.

10. The tidal current information display apparatus of claim 9, wherein a characteristic of each symbol including a length of the arrow, a thickness of the arrow, and a color of the arrow is varied based on corresponding predicted speed of the tidal current.

11. An augmented reality (AR) navigation apparatus for a movable body, for superimposing tidal current information on an image displayed on a display screen, comprising:
a tidal current information receiving terminal configured to receive tidal current information including a position of a tidal current on a chart of a region including the movable body, and a plurality of predicted tidal current directions of the tidal current at said position at a corresponding plurality of time instants; and
a processing circuitry configured to:
receive a display position of the tidal current on the display screen;
generate an indicator including a time scale determined according to the plurality of time instants, wherein a direction of a reference axis of the time scale coincides with a vertical axis of the display screen;
determine position of each predicted tidal current direction on the time scale at respective time instant;
generate a plurality of symbols for respective positions on the time scale on the indicator, each symbol indicating respective predicted tidal current direction at respective time instant; and
associate the indicator including the plurality of symbols with the display position of the tidal current on the display screen.

12. The AR navigation apparatus of claim 11, further comprising:
an image sensor, attached onto the movable body, and configured to capture the image and output image data;
an image sensor information terminal configured to receive and store an image sensor information including a position and azimuth of the image sensor;
a chart information terminal configured to receive and store chart information indicating the chart of the region including the movable body;
the display screen;
the processing circuitry configured to:
calculate the display position of the tidal current on the display screen based on the image sensor information;
generate a display symbol corresponding to the display position of the tidal current, superimpose the display symbol on the image at the display position, to generate a superimposed image.

13. The AR navigation apparatus of claim 12, wherein the processing circuitry is further configured to:
receive the indicator including the plurality of symbols;
superimpose the indicator on the superimposed image at a position above the display symbol on the display screen to generate a final superimposed image; and
output the final superimposed image to the display screen.

14. The AR navigation apparatus of claim 13, wherein the display screen is configured to display at least one of: the superimposed image, the indicator, and the final superimposed image.

15. The AR navigation apparatus of claim 14, wherein:
the superimposed image is displayed on the display screen; and
the indicator is displayed on an external display screen.

16. The AR navigation apparatus of claim 11, wherein:
the time scale is a concentric ellipse type time scale including a plurality of concentric ellipses, in that radii of each concentric ellipse correspond to a time instant of the plurality of time instants, wherein a direction of a reference axis of the concentric ellipse type time scale coincides with the vertical axis of the display screen, and
wherein each symbol is positioned on a circumference of respective concentric ellipse at a position corresponding to predicted tidal current direction.

17. A method for displaying tidal current information on a display screen, comprising:
receiving tidal current information including a position of a tidal current on a chart of a region including the movable body, and a plurality of predicted tidal current directions of the tidal current at said position at a corresponding plurality of time instants;
generating an indicator including a time scale determined according to the plurality of time instants;
determining position of each predicted tidal current direction on the time scale at respective time instant;
generating a plurality of symbols for respective positions on the time scale, each symbol indicating respective predicted tidal current direction at respective time instant;
determining a direction of each symbol on the time scale, with respect to a reference axis of geographic information displayed on the display screen; and
outputting the indicator including the plurality of symbols to the display screen.

18. A non-transitory computer readable medium having stored thereon computer-executable instructions which, when executed by a computer, cause the computer to:
receive tidal current information including a position of a tidal current on a chart of a region including the movable body, and a plurality of predicted tidal current directions of the tidal current at said position at a corresponding plurality of time instants;

generate an indicator including a time scale determined according to the plurality of time instants;

determine position of each predicted tidal current direction on the time scale at respective time instant;

generate a plurality of symbols for respective positions on the time scale, each symbol indicating respective predicted tidal current direction at respective time instant;

determine a direction of each symbol on the time scale, with respect to a reference axis of geographic information displayed on the display screen; and output the indicator including the plurality of symbols to the display screen.

* * * * *